May 22, 1951
E. HUG ET AL
2,553,919
VALVE ARRANGEMENT FOR FILLING AND EMPTYING GAS TANKS
Filed Oct. 20, 1947
2 Sheets-Sheet 1
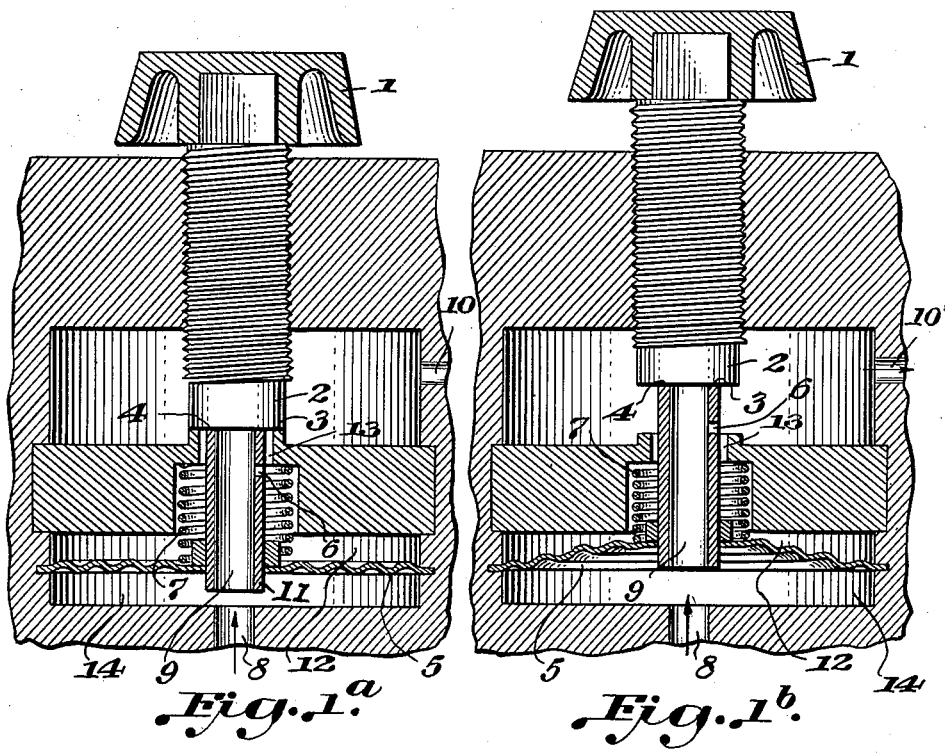
Fig.1ᵃ.   Fig.1ᵇ.
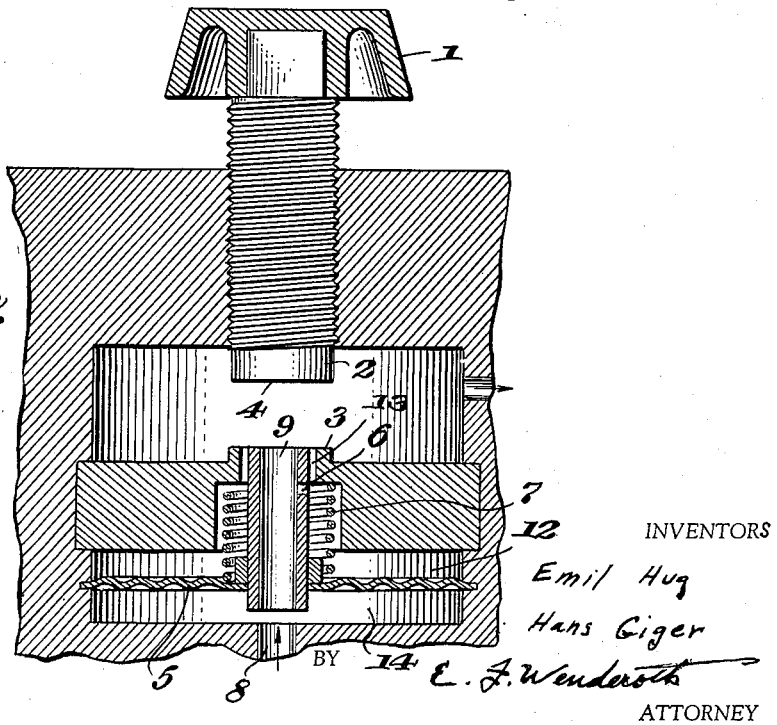
Fig.1ᶜ.
INVENTORS
Emil Hug
Hans Giger
BY E. F. Wenderoth
ATTORNEY May 22, 1951  E. HUG ET AL  2,553,919
VALVE ARRANGEMENT FOR FILLING
AND EMPTYING GAS TANKS
Filed Oct. 20, 1947  2 Sheets-Sheet 2
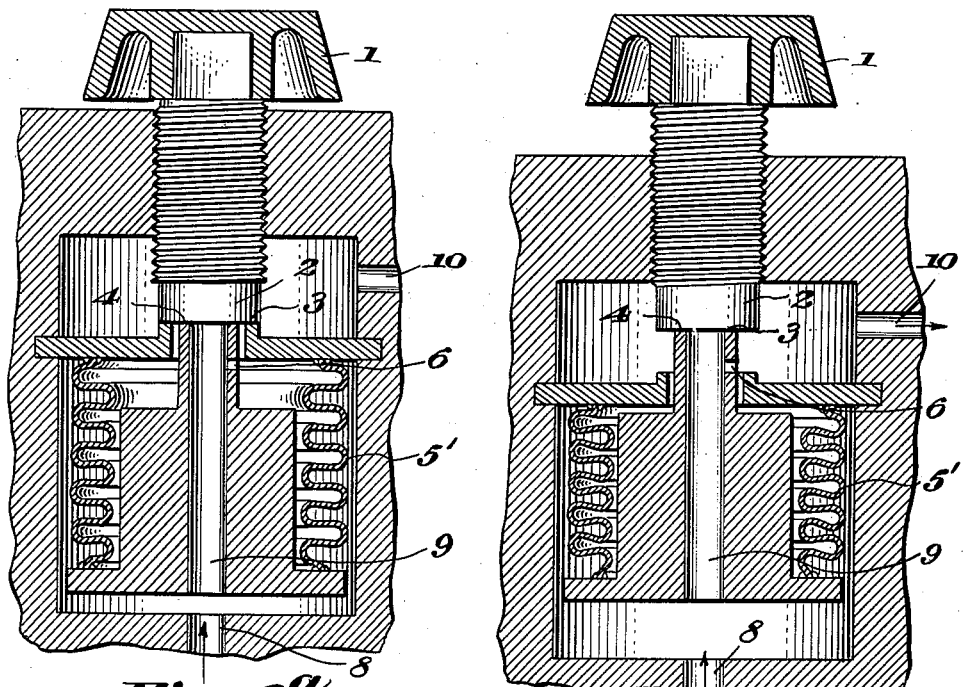
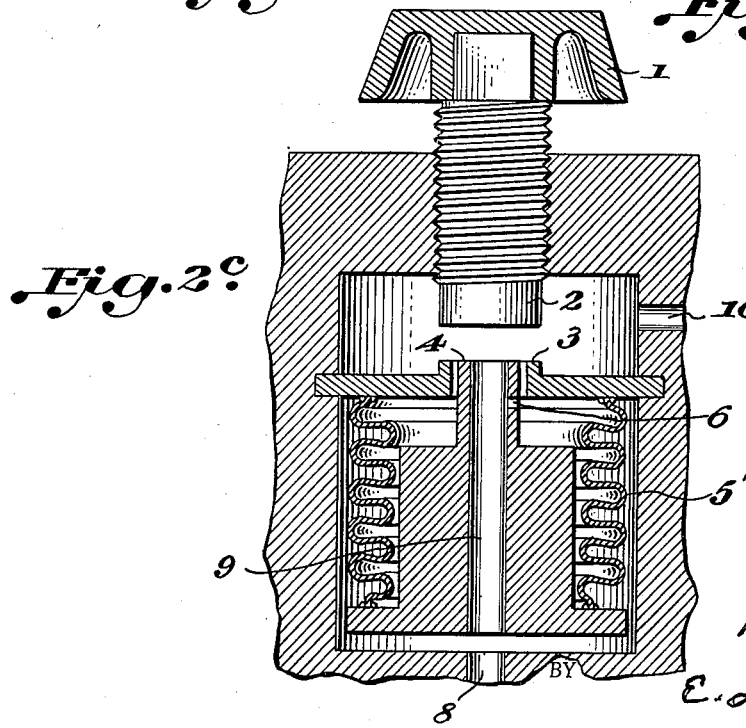
INVENTORS
Emil Hug
Hans Giger
BY
E. F. Wenderoth
ATTORNEY Patented May 22, 1951

2,553,919

UNITED STATES PATENT OFFICE 2,553,919

VALVE ARRANGEMENT FOR FILLING AND EMPTYING GAS TANKS

Emil Hug and Hans Giger, Ennetburgen, Switzerland, assignors to The Burckhardt Engineering Works, Basel, Switzerland, a Swiss firm Application October 20, 1947, Serial No. 780,780
In Switzerland October 21, 1946

4 Claims. (Cl. 251—119)

In practice, the burning out of high-pressure valves, in particular in high-pressure oxygen plants, is a relatively frequent occurrence. Very often, major accidents are connected therewith, caused by the explosion of valves, filter vessels and of other portions of the installation due to pressure and splinter effects or conflagrations, whereby persons may suffer injuries in the form of burns, loss of eye-sight or hearing or worse. Such occurrences entail disastrous results in high-altitude oxygen breathing apparatus on board an airplane.

In order to avoid such possibilities, attempts have been made to design fireproof high-pressure gas valves with the aid of diversified means and measures. In spite of such attempts, it has proved impossible up to the present, to positively prevent such burning-out.

The primary cause of the most frequent valve explosions is the heat of compression which arises when a closed hollow space subject to atmospheric pressure is set under high pressure. Since, with the valves used today, the pressure rise after opening the valve is very rapid, there will be no time to dissipate the heat of compression. This is due to the phenomenon of adiabatic compression.

By an adiabatic compression of non-heated oxygen, standing under atmospheric pressure to for instance 150 atm. gauge, the final temperature attained will be in the neighborhood of 900° C. Such a temperature in air is sufficiently high for igniting easily to moderately inflammable organic substances; and in highly compressed oxygen such danger exists to an even higher degree.

All the prior investigation and preventive measures tended to remove any inflammable substances from the valves and to use in this manufacture only materials of low inflammability. Practical experience, however, shows that the possibility of soiling the valves as well as inside plant portions on the way from manufacturer to user, which the equipment has to cover, on one hand, and especially during their operation on the other hand—are so numerous and non-controllable that the requirement of keeping everything sufficiently clean cannot be entirely fulfilled in practice. This applies in particular to places of use where oil, grease, alcohol or gasoline are used in the immediate neighborhood.

The main object of this invention, which relates to a valve arrangement suitable for the filling and emptying of gas tanks and more particularly of oxygen flasks, consists in removing these disadvantages.

According to the present invention a valve is provided, in which—when it is opened—adiabatic compression in the system connected thereto is impossible, thereby preventing the ignition of packing means or of organic substances present in the form of impurities. Such requirements, however, can only be fulfilled by an automatically controlled valve.

The valve arrangement of the present invention comprises primarily means for liberating the gas—upon opening the valve by a handwheel—first only through a particular cross-section, leading into a predisposed chamber, which cross-section is less than the sectional area of flow limited by the movable valve portion and the seat of the valve, the said sectional area of flow limited by the movable valve portion and the seat of the valve being automatically released only subsequently after a certain pressure has been produced in the said predisposed chamber, so that further quantities of gas will be liberated through the sectional area of flow, any inadmissibly high gas temperature being thus prevented in the predisposed chamber.

The invention will be obvious from the following detailed description of two preferred embodiments thereof, discussed by way of example only in conjunction with the accompanying drawings, in which Fig. 1a is a longitudinal sectional view of one form of valve in closed position;

Fig. 1b is a view of the valve of Fig. 1a in an intermediate position;

Fig. 1c is a view of the valve of Fig. 1a in open position;

Fig. 2a is a longitudinal section view of a second embodiment of a valve in accordance with the present invention in closed position;

Fig. 2b is a view of the valve of Fig. 2a in an intermediate position;

Fig. 2c is a view of the valve of Fig. 2a in open position.

In Fig. 1a the valve is shown in a closed position. The numeral 1 designates a handwheel for manually operating the valve. The movable shouldered spindle portion 2 is adapted to abut against valve seat 3 in sealing relationship. A bore 6 is provided in a tube 11 so that gas pressure may be counterbalanced, some of the gas flowing through the axial bores 8 and 9 respectively and the lateral bore 6 into the space 12, so that the membrane 5 is unloaded.

By turning the handwheel 1 the movable spindle sealing portion 2 will be raised off its seat 3 and the pressure in the space 12 above the membrane 5 is relieved through bore 10 and thus drops immediately. The pressure of the supply below the membrane 5 in the space 14 will continuously press the seat 4 upward against the valve portion 2 as it is raised, the seat 4 following the valve portion 2 over its entire length of stroke as shown in Fig. 1b, thus loading the spring 7. During this operation the gas can only flow out through the bore 6 and pass into the predisposed gas space, the pressure in the latter thus rising only slowly due to the small aperture of the bore 6. Simultaneously the pressure in space 12 will also rise due to the escapement of gas through the recess 13. At the moment, when the downward pressure in the system and thus in the space above the membrane 5, increased by the tension of the spring 7, surpasses the upward pressure of the supply against the membrane 5, the seat 4 will automatically drop off of the valve portion 2 and return into the unloaded position of the membrane. At this moment the entire top opening of the bore 9 is uncovered as shown in Fig. 1c. As shown in the drawings the cross-section of the bore 6 is much smaller than the top opening of the bore 9 limited by the portions 2 and 3 respectively.

By arranging the bore 6 in the manner shown the occurrence of a sudden pressure surge at any point of the predisposed gas room connected with the valve arrangement is prevented. If a sudden pressure surge would occur, a substantially adiabatic compression as well as an inadmissibly high temperature raise of the gas in the predisposed gas room would be caused, thus enabling the burning off of the valve arrangement.

Tests on an experimental valve of 8 millimeters diameter and 400 millimeters length, to which easily inflammable substances, in particular alcohol, had been added in various quantities, and under operating pressures such as prevail in practice, has determined the diameter of the bore 6.

The second embodiment shown in Figs. 2a, 2b, and 2c utilizes like reference numerals as in Figures 1a, 1b, and 1c for the like parts. This second embodiment only differs from the first described embodiment in that, instead of the membrane and the spring, a corrugated spring tube 5' is used. The operation is simliar however to that of the first embodiment.

All the parts and portions of the valve shown are coaxial, and either are made of brass or stainless steel.

The valve arrangements according to the present invention may be disposed directly on a high-pressure tank to be filled or emptied, for instance on compressed-gas transport flasks, accumulators and the like, but also at any point of a high-pressure distributing system, e. g. on gas producers, refilling plants, consumers' lines and the like.

What we claim is:

1. A valve device for high pressure gas containers comprising a body member, a movable valve part rotatably journalled in said body member, a stationary valve seat in said body member having a bore therethrough, a slidable tube in said bore in said stationary valve seat, a port communicating with the bore of said tube, said stationary valve seat dividing said valve into a first and a second chamber when said valve is in closed position, the upper end of said tube forming a movable valve seat in contact with the lower end of said movable valve part, a flexible diaphragm connected to said tube, gas pressure in said container normally maintaining contact between said movable valve seat and said movable valve part, said port in said tube allowing passage of gas therethrough into said first and second chambers when said movable part of said valve is removed from said stationary valve seat for equalizing pressure in said two chambers whereupon said movable valve seat will drop from contact with said movable valve part and normal flow through said tube and said valve will ensue.

2. A valve device for high pressure gas containers comprising a body member, a stationary valve seat in said body member, a spindle rotatably journalled in said body member, a valve surface formed by the lower end of said spindle, said valve seat having a bore therethrough, a tube movably inserted in said bore having a portion spaced from the side walls of said bore, a flexible diaphragm in said body member secured to said tube, a port communicating with and of smaller cross sectional area than the bore in said tube, a first chamber in said member formed between said stationary valve seat and said flexible diaphragm when said spindle is in contact with said stationary valve seat and a second chamber in said member above said stationary valve seat, the upper end of said tube forming a movable valve seat normally in contact with the lower end of said spindle, said port in said tube allowing passage therethrough of gas into said first chamber when said valve is in closed position and into said first chamber and said second chamber when said spindle is raised from said stationary valve seat, said tube being normally maintained in contact with the lower end of said spindle due to gas pressure in the container below said diaphragm, said tube being separated from said spindle upon equalization of gas pressure in said chambers.

3. A valve device for high pressure gas containers as claimed in claim 2, and wherein a spring is inserted between said stationary valve seat and said diaphragm for aiding separation of said spindle from said movable valve seat on said tube.

4. A valve device for high pressure gas containers as claimed in claim 2, said diaphragm comprising a spring tube connected at one end thereof to said stationary valve seat and at the other end thereof to said tube, said first chamber being defined by said spring tube, said spring tube aiding in separation of said movable valve seat from said spindle upon equalization of gas pressure in said chambers.

EMIL HUG.
HANS GIGER.

REFERENCES CITED

The following references are of record in the file of this patent:

UNITED STATES PATENTS

| Number | Name | Date |
|---|---|---|
| 2,219,408 | Benz | Oct. 29, 1940 |

FOREIGN PATENTS

| Number | Country | Date |
|---|---|---|
| 10,380 | Great Britain | of 1910 |